US009193052B2

(12) United States Patent
Ho et al.

(10) Patent No.: US 9,193,052 B2
(45) Date of Patent: Nov. 24, 2015

(54) MOUNTING SYSTEM FOR A GAS GUN

(75) Inventors: Jung-Mao Ho, Dadu Township (TW); Shen-Mou Wang, Shengang Township (TW); Chang-Sheng Lin, Dajia Township (TW)

(73) Assignee: Hilti Aktiengesellschaft, Schaan (LI)

( * ) Notice: Subject to any disclaimer, the term of this patent is extended or adjusted under 35 U.S.C. 154(b) by 243 days.

(21) Appl. No.: 13/257,915

(22) PCT Filed: Mar. 22, 2010

(86) PCT No.: PCT/EP2010/053724
§ 371 (c)(1),
(2), (4) Date: Jan. 31, 2012

(87) PCT Pub. No.: WO2010/106192
PCT Pub. Date: Sep. 23, 2010

(65) Prior Publication Data
US 2012/0119058 A1  May 17, 2012

(30) Foreign Application Priority Data

Mar. 20, 2009  (TW) ............................... 98109150 A (51) Int. Cl.
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |
| B25C 1/08 | (2006.01) |
| F16B 5/02 | (2006.01) |
| F16M 13/00 | (2006.01) |
| F16F 7/00 | (2006.01) |
| F16B 43/00 | (2006.01) |

(52) U.S. Cl.
CPC ................. *B25C 1/08* (2013.01); *F16B 5/0258* (2013.01); *F16B 43/001* (2013.01)

(58) Field of Classification Search
CPC ...................................... F16B 43/001
USPC ................. 248/562, 610, 636, 638, 342, 631; 310/51; 267/136, 140.11, 140.13
See application file for complete search history.

(56) References Cited

U.S. PATENT DOCUMENTS

| 3,137,466 | A | * | 6/1964 | Rasmussen ................... 248/562 |
| 4,483,474 | A | | 11/1984 | Nikolich |
| 6,339,267 | B1 | | 1/2002 | Fujii et al. |
| 6,402,129 | B1 | * | 6/2002 | Tani .............................. 267/136 |
| 6,619,527 | B1 | | 9/2003 | Moeller |
| 7,118,018 | B2 | | 10/2006 | Turk |
| 7,500,587 | B2 | | 3/2009 | Akiba et al. |
| 2004/0173657 | A1 | | 9/2004 | Turk |

OTHER PUBLICATIONS

Russian Notice of Grant dated Oct. 7, 2014 (Seven (7) pages).

* cited by examiner

*Primary Examiner* — Jonathan Liu
*Assistant Examiner* — Taylor Morris
(74) *Attorney, Agent, or Firm* — Crowell & Moring LLP (57) ABSTRACT

A mounting system for a gas gun, for mounting a motor, is disclosed. The mounting system includes a cylinder, a rigid carrier for carrying the motor such that the motor is disposed through the cylinder and is floatingly movable along an axis, a fixing member, fixedly arranged at an end plane of the cylinder and limited the carrier in the cylinder, and at least one elastic element embedded into the embedding hole of the carrier. The elastic element has a first buffering body extending between one side of the carrier and the fixing member for absorbing a positive vibrating energy of the motor and a second buffering body extending between the other side of the carrier and the cylinder for absorbing a negative vibrating energy of the motor. Dynamic energy generated during vibration of the motor is absorbed by the first and second buffering bodies to achieve the damping effect.

12 Claims, 8 Drawing Sheets

Fig. 1

PRIOR ART

Fig. 2

PRIOR ART

MOUNTING SYSTEM FOR A GAS GUN

This application claims the priority of International Application No. PCT/EP2010/053724, filed Mar. 22, 2010, and Taiwan Patent Document No. 98109150, filed Mar. 20, 2009, the disclosures of which are expressly incorporated by reference herein.

BACKGROUND AND SUMMARY OF THE INVENTION

The present invention relates to a mounting device, in particular, a mounting system for a gas gun that is used for a suspension system and has a damping effect.

Figure 1:
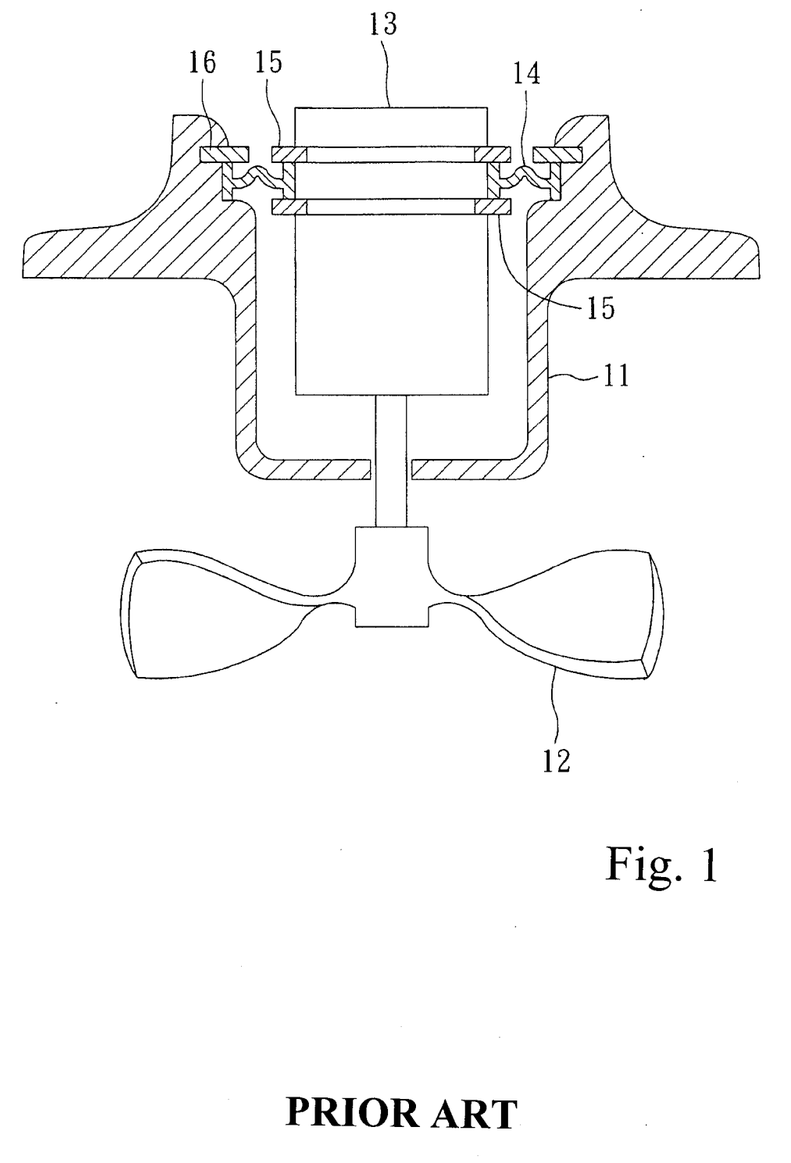
FIG. 1 is a cross section of a mounting system according to U.S. Pat. No. 7,118,018.

With reference to FIG. 1, taking the U.S. Pat. No. 7,118,018 for example, a known device comprises a cylinder 11, a fan 12 disposed outside the cylinder 11, a motor 13 disposed inside the cylinder 11 and used for driving the fan 12, an elastomer 14 surrounding the motor 13, two retaining rings 15 surrounding the motor 13 and arranged at both sides of the elastomer 14, and a securing ring 16, surrounding an inner surface of the cylinder 11 and holding the elastomer 14 in place with respect to the cylinder 11. The motor 13 is mounted inside the cylinder 11 and the elastomer 14 absorbs the dynamic energy when the motor vibrates so as to create a damping effect.

However, since the elastomer 14 is not made of a stiff material, it may be bent and deformed by an external force during installation and cannot be easily fixed; in addition, since there is no fixed connection relation between the elastomer 14 and the motor 12 or the cylinder 11, and the orientation is merely achieved by the position limiting effect of the retaining rings 15 or the retaining ring 16, the elastomer 14 may easily slide away under the weight of the motor 13 and the fan 12 when the motor vibrates, making the installation uneasy and impractical.

Figure 2:
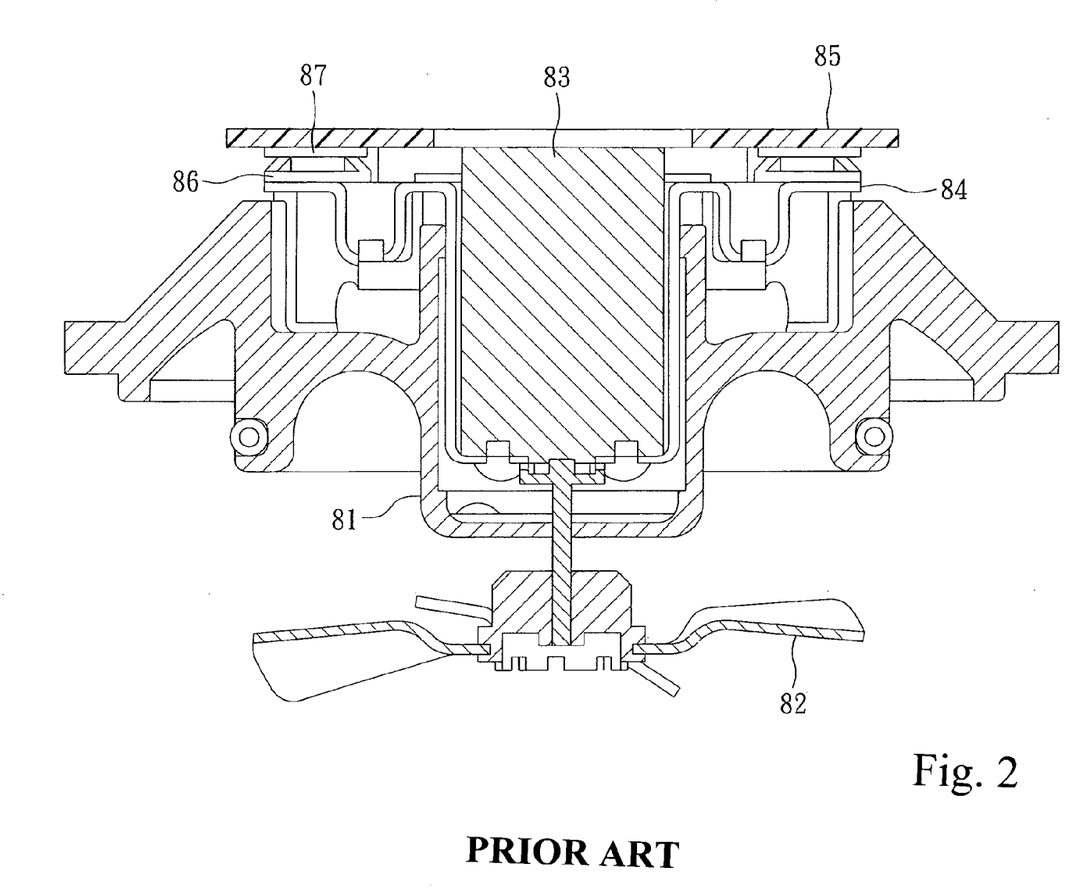
FIG. 2 is a cross section of a mounting system according to U.S. Pat. No. 6,619,527.
Figure 3:
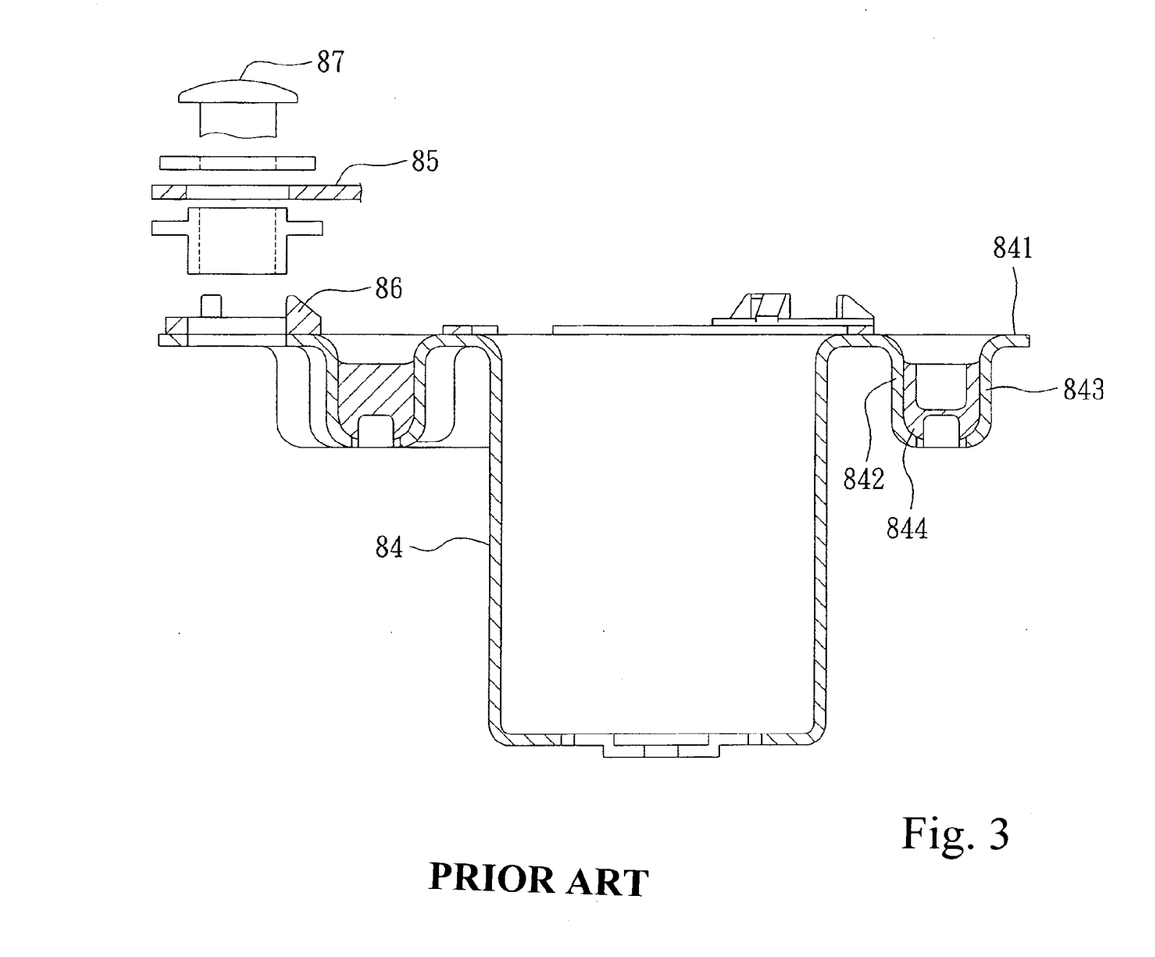
FIG. 3 is a cross section of a bracket according to U.S. Pat. No. 6,619,527.

With reference to FIGS. 2 and 3, taking the U.S. Pat. No. 6,619,527 for example, a known device comprises a cylinder 81, a fan 82 disposed outside the cylinder 81, a motor 83 disposed within the cylinder 81 and used for driving the fan 82, a bracket 84 carrying the motor 83 and an annular plate 85 on the bracket 84, several elastic elements 86 disposed between the annular plate 85 and the bracket 84, and several plugs 87 extending through the annular plate 85, the bracket 84 and threaded with the cylinder 81. The bracket 84 has an annular edge 841 surrounding an axis X and spanning an end surface of the cylinder 81, an inner annular wall 842 and an outer annular wall 843 which are adjacent the ring edge 841, and an elastomer 844 between the inner and outer annular walls 842, 843. The motor 83 is mounted within the cylinder 81, and the elastomer 844 and the elastic elements 86 absorb the dynamic energy when the motor vibrates 83 so as to create a damping effect.

However, since the elastomer 844 has its inner and outer sides engaged with the inner and outer annular walls 842, 843, the suspending effect of the elastomer 844 may be affected when the motor 83 vibrates along the axis X as its inner and outer sides are limited by the inner and outer annular walls 842, 843. Therefore, it is necessary to further use the elastic elements 86 which are flexible in the direction of the axis X. In this way, the damping effect can be improved, but the assembly is complex and the installation is uneasy.

According to an embodiment of the invention, the mounting system for a gas gun is used for mounting a motor, and it comprises a receiving member with a receptacle, particularly shaped as a cylinder, a motor, a rigid carrier, a fixing member, and at least one damping element. The carrier is used for carrying the motor such that the motor is floatingly movable with respect to the receiving member along an axis, the carrier being further provided with at least one embedding hole along a direction in parallel to the axis. The fixing member may be used for limiting the displacement of the carrier. The damping element is embedded within the embedding hole of the carrier, and has an elastomeric first buffering body arranged between the carrier and the fixing member, and an elastomeric second buffering body arranged between the carrier and the receiving member. The first buffering body damps a movement of the motor in a first direction along the axis, and the second buffering body damps a movement of the motor in a second direction along the axis, whereby the second direction is opposite to the first direction.

According to an embodiment of the invention, the carrier is used to carry the motor, which improves the simplicity and stability of the installation. The elastomeric elements between the carrier and the fixing member, and between the carrier and the receiving member, respectively, may contribute to achieve a damping effect.

DETAILED DESCRIPTION OF THE DRAWINGS

The aforesaid and other technical contents, the characteristics and the functions of the present invention will be illustrated hereinafter by reference to the drawings and several preferred embodiments.

Figure 4:
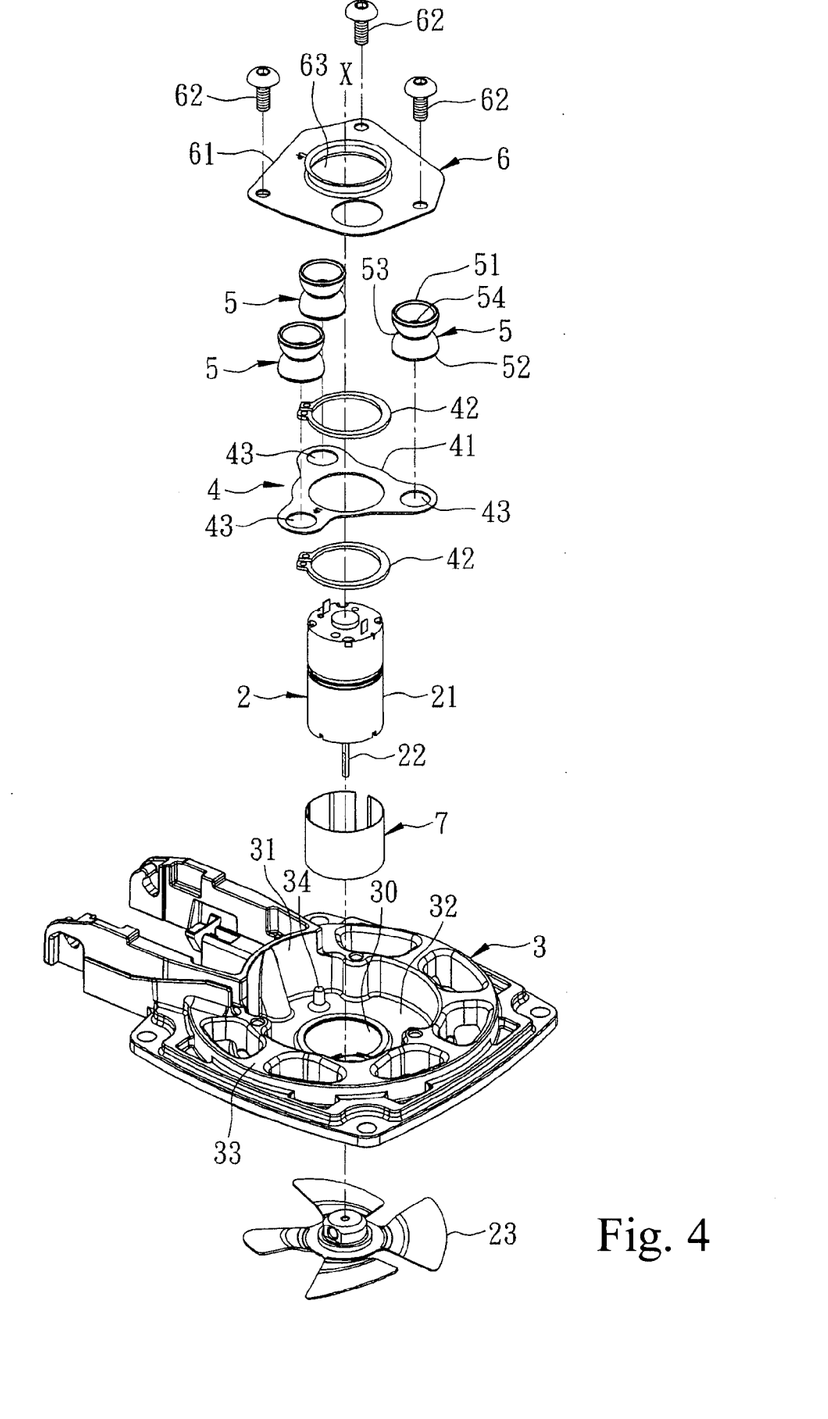
FIG. 4 is a decomposed stereo-gram illustrating a preferred embodiment in which the motor mounting device of the gas gun of the present invention is mounted in a cylinder.
Figure 5:
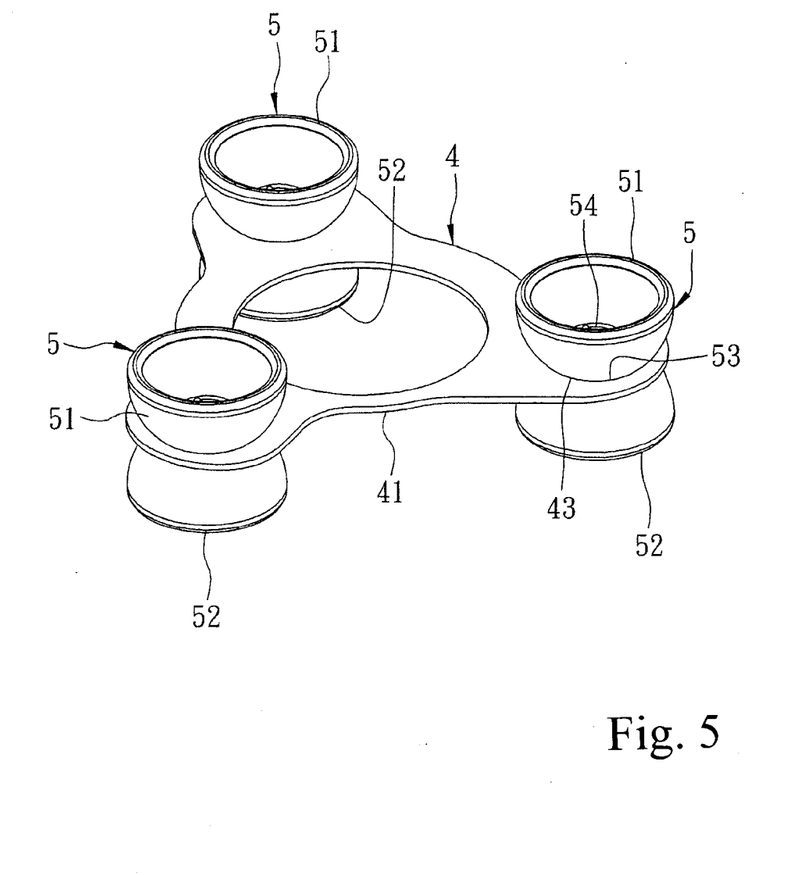
FIG. 5 is a combined stereo-gram of a carrier, three elastic elements and a motor in the preferred embodiment.
Figure 6:
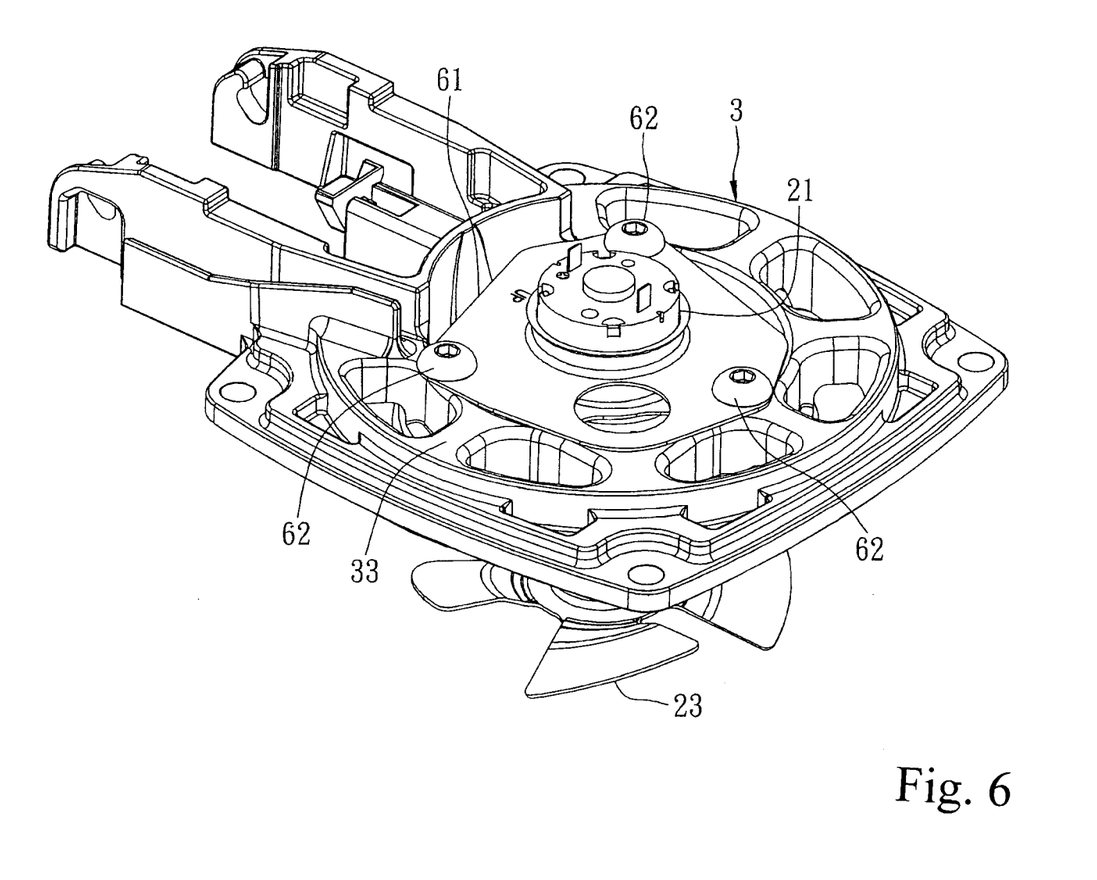
FIG. 6 is a combined stereo-gram of the preferred embodiment and the cylinder.

By reference to FIGS. 4, 5 and 6, one preferred embodiment of a mounting system of a gas gun is applied for mounting a motor fan set 2, wherein the motor fan set 2 has a motor 21, a rotary shaft 22, and a fan 23 fixed to the rotary shaft 22 so as to move together. The mounting system comprises a cylinder 3, acting as a receiving member, a rigid carrier 4, three damping elements 5, a fixing member 6 and a liner 7.

The cylinder 3 has an annular wall 31 surrounding an axis X and limiting a receptacle 30, a shoulder 32 extending from the annular wall 31 and extending in a direction perpendicular to the axis X, an end plane 33 exposing the receptacle 30 and a guiding element 34 formed on the shoulder 32.

The carrier 4 has a guiding piece 41 surrounding the motor 21 and disposed within the cylinder 3, two retaining rings 42 engaging an annular groove of the motor 21 and limiting the guiding piece 41 at both sides, and three embedding holes 43 extending through the guiding piece 41 along a direction in parallel to the axis X.

The damping element 5 has a first buffering body 51 and a second buffering body 52, both made of an elastomer, an annular groove 53 formed between the first and second buffering bodies 51, 52, and embedded in the embedding hole 43 of the carrier 4, and an air channel 54 extending along a direction in parallel to the axis X. When the damping elements 5 are embedded into the embedding holes 43 of the carrier 4, the first buffering body 51 and the second buffering body 52 extend to both sides of the guiding piece 41 of the carrier 4, respectively.

The first and second buffering bodies 51, 52 are hollow semi-circular bodies in this preferred embodiment that have a great deformation for achieving an excellent damping effect. In addition, the second buffering body 52 is engaged by the guiding member 34 of the cylinder 3, whereby the air channel 54 acts as a cavity which is engaged by the guiding member 34. The air channel 54 also allows air to escape from the damping element 5 during compression of the first and second buffering bodies 51, 52, so as to enhance the damping effect.

The fixing member 6 has a plate 61 secured to an end plane 33 of the cylinder 3, by several bolts 62 passing through the plate 61 and threaded with the cylinder 3. The plate 61 is provided with a through hole 63 extending through the plate 61 along the axis X for allowing the motor 21 to pass therethrough. Thereby, the plate 61 is secured to the cylinder 3 and limits the carrier 4 between the cylinder 3 and the fixing member 6. A liner 7 is disposed between the motor 21 and the receptacle 30 of the cylinder 3 for heat isolation.

Figure 7:
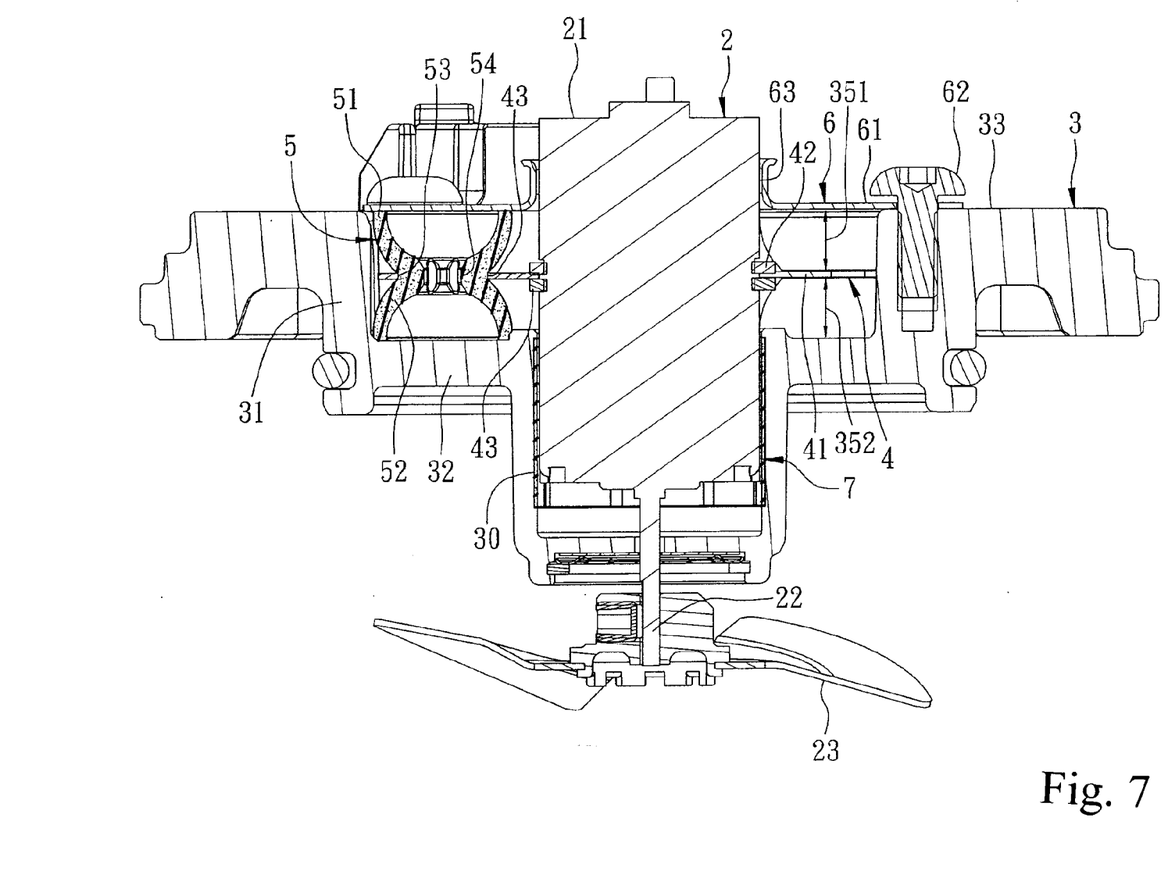
FIG. 7 is a cross section of FIG. 4.

By reference to FIGS. 5 and 7, since the damping elements 5 are embedded in advance in the embedding holes 43 of the carrier 4, and the components (the guiding piece 41 and the retaining rings 42) of the carrier 4 are made of rigid materials, the installation can be carried out in such a smooth way that the guiding piece 41 is firstly put over the motor 21 and then the retaining rings 42 are arranged so as to engage an annular groove of the motor 21 and hold the guiding piece 41 such that the carrier 4 carries the motor 21.

Then, the carrier 4 and the motor 21 are disposed in the receptacle 30 of the cylinder 3 along the axis X such that the carrier 4 and the motor 21 as well as the second buffering body 52 and the guiding piece 34 of the cylinder 3 are aligned. Thereby, any misalignment of the damping elements 5 around the axis X is prevented, and the carrier 4 together with the motor 21 is disposed on the shoulder 32 of the cylinder 3 and forms a space 351 from the cylinder 3 so as to allow the motor 21 to upwardly displace along the axis X, and another space 352 from the fixing member 6 so as to allow the motor 21 to downwardly displace along the axis X. At last, the plate 61 is secured to the end plane 33 of the cylinder 3 by the bolts 62 of the fixing member 6, such that an end part of the motor 21 and an electrical line control circuit for driving the motor 21 extend through the through hole 63. Thereby, the carrier 4 is held between the plate 61 of the fixing member 6 and the shoulder 32 of the cylinder 3 via the damping elements 5 and thus the motor 21 is positioned in the receptacle 30 of the cylinder 3.

Specifically, the first buffering body 51 of the damping element 5 is held between the plate 61 of the fixing member 6 and the guiding piece 41 of the carrier 4, and the second buffering body 52 is held between the guiding piece 41 of the carrier 4 and the shoulder 32 of the cylinder 3. As a result of this, when the motor 21 vibrates, the carrier 4 floats along with the motor 21 along the axis X, no matter whether the motor 21 moves upwardly or downwardly along the axis X, and the elastic elements 5 absorb the dynamic energy generated by the vibration of the motor 21 so as to achieve the desired damping effect.

The most efficient damping effect may be achieved along the axis X, and only a single damping element or a set of a few damping elements 5 are required to achieve the desired damping effect. In this way, the assembly of the whole mechanism is simplified and manufacturing costs may be reduced.

Also, since the damping elements 5 are embedded in advance in the embedding holes 43 of the carrier 4, a simplification of installation may be achieved.

Figure 8:
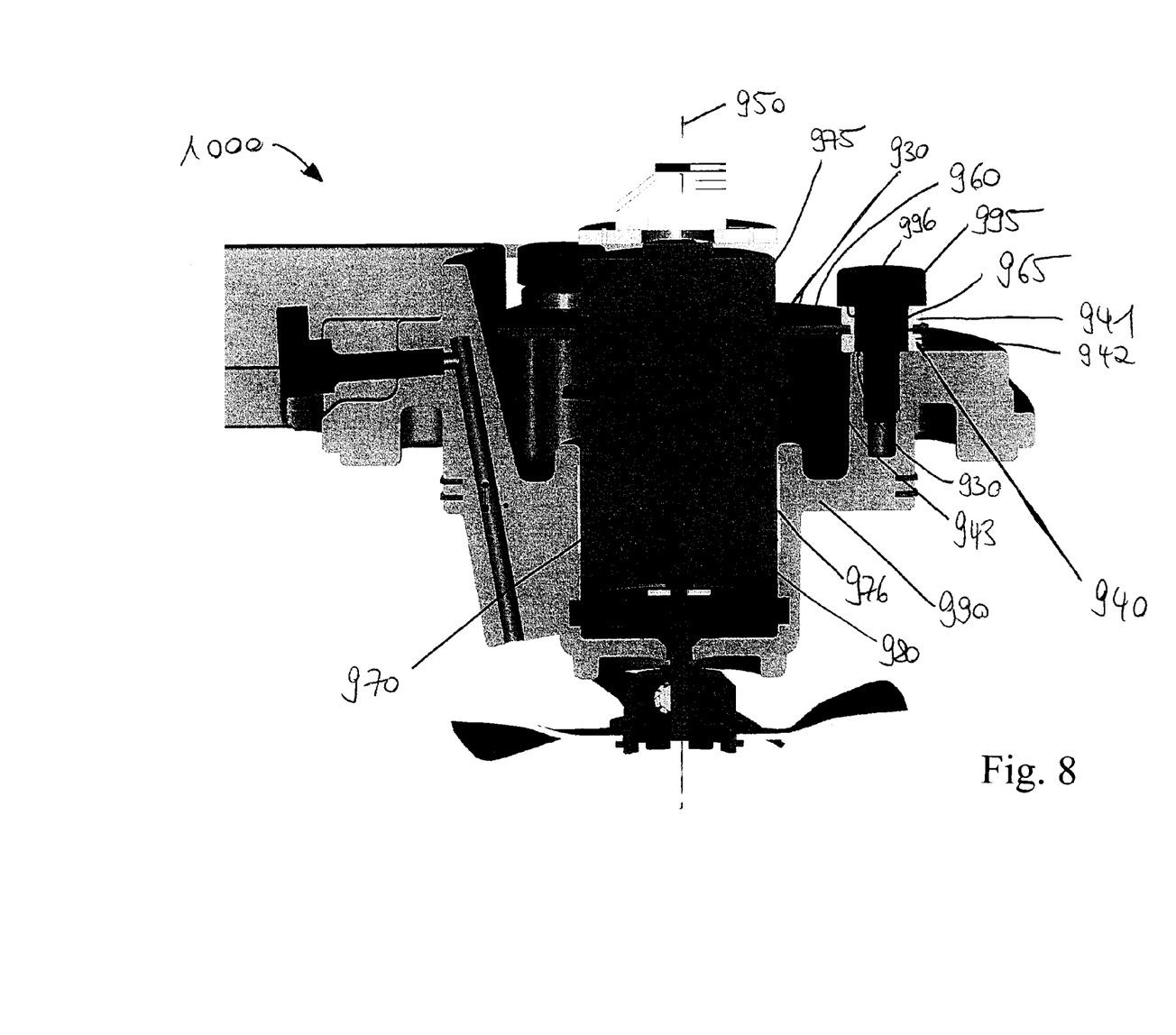
FIG. 8 is a cross section of a further preferred embodiment.

By reference to FIG. 8, a mounting system 1000 for a gas gun, for mounting a motor, comprises a receiving member 990 having a receptacle 980, a fixing member 995 fixedly secured to the receiving member 990, and a motor 970 received within the receptacle 980, and a carrier 960 fixedly secured to the motor. A liner 976 is disposed between the motor and the receptacle. The motor 970 is provided with two annular grooves 975, and the carrier 960 comprises two retaining rings 930 engaging the two grooves 975, respectively. The motor 970 together with the carrier 960 is floatingly movable with respect to the receiving member 990 along an axis 950, and the carrier 960 is provided with at least one embedding hole 965 which extends through the carrier 960 along a direction in parallel to the axis 950. According to a preferred embodiment, the fixing member 995 is designed as a fastening element, such as a screw, a bolt or the like.

A damping element 940 extends through the embedding hole 965 of the carrier 960 and has a first buffering body 941 arranged between the carrier 960 and the fixing member 995, a second buffering body 942 arranged between the carrier 960 and the receiving member 990, and an annular recess 943 formed between the first and second buffering bodies 941, 942. The annular recess 943 is embedded in the embedding hole 965. Both the first and second buffering bodies comprise an elastomeric material.

The receiving member 990 comprises a shoulder 930 extending along a direction crosswise with respect to the axis 950. The second buffering body 942 abuts against the shoulder. The fixing member 995 comprises a shoulder 996 abutting against the first buffering body 941. Therefore, the first buffering body 941 damps a movement of the motor 970 in a first direction along the axis 950, the second buffering body 942 damps a movement of the motor 970 in a second direction along the axis 950 opposite to the first direction.

The above embodiment is merely a preferred embodiment of the present invention. A person skilled in the art would recognize that the present invention is not limited to this embodiment, and any derivations and variations done according to the claims and description of the present application should be regarded as falling into the scope of the present application.

The invention claimed is:

1. A mounting system for a gas gun, comprising:
   a receiving member, wherein the receiving member has a receptacle;
   a motor disposed within the receptacle, wherein the motor is floatingly movable with respect to the receiving member along an axis;
   a carrier fixedly secured to the motor, wherein the carrier includes an embedding hole;
   a fixing member fixedly secured to the receiving member; and
   a damping element extending through the embedding hole and having an elastomeric first buffering body arranged between the carrier and the fixing member, and an elastomeric second buffering body arranged between the carrier and the receiving member, wherein a movement of the motor in a first direction along the axis is dampable by the first buffering body, and wherein a movement of the motor in a second direction along the axis opposite to the first direction is dampable by the second buffering body;

wherein the receiving member further has an annular wall surrounding the axis and a shoulder extending from the annular wall in a direction perpendicular to the axis;

wherein the second buffering body abuts against the shoulder;

wherein the annular wall has an uppermost surface and wherein the entire carrier is arranged below the uppermost surface.

2. The mounting system for a gas gun according to claim 1, wherein the motor includes an annular groove and wherein the carrier engages the groove.

3. The mounting system for a gas gun according to claim 2, wherein the carrier includes a retaining ring and wherein the retaining ring engages the groove.

4. The mounting system for a gas gun according to claim 1, wherein the fixing member includes a plate, wherein the plate is secured to an end plane of the receiving member, and wherein the first buffering body abuts against the plate.

5. The mounting system for a gas gun according to claim 4, wherein the plate includes a through hole and wherein the motor is floatingly movable through the through hole.

6. The mounting system for a gas gun according to claim 1, wherein the damping element includes an annular recess formed between the first and second buffering bodies and wherein the annular recess is embedded in the embedding hole.

7. The mounting system for a gas gun according to claim 1, wherein the receiving member includes a guiding element formed on the shoulder, and wherein the guiding element and the second buffering body engage.

8. The mounting system for a gas gun according to claim 7, wherein the second buffering body includes a cavity, and wherein the guiding element is received in the cavity.

9. The mounting system for a gas gun according to claim 1, wherein the damping element includes an air channel extending from the first buffering body to the second buffering body and wherein air is escapable from the damping element through the air channel when the first buffering body or the second buffering body is compressed.

10. The mounting system for a gas gun according to claim 1, further comprising a liner disposed between the motor and the receptacle.

11. The mounting system for a gas gun according to claim 1, wherein the first and second buffering bodies are each hollow semi-circular bodies.

12. A gas gun comprising a mounting system according to claim 1.

* * * * *